United States Patent

Mohlin

(10) Patent No.: US 12,234,780 B2
(45) Date of Patent: Feb. 25, 2025

(54) INTERNAL COMBUSTION ENGINE SYSTEM

(71) Applicant: Volvo Truck Corporation, Gothenburg (SE)

(72) Inventor: Anders Mohlin, Kungsbacka (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 0 days.

(21) Appl. No.: 18/609,574

(22) Filed: Mar. 19, 2024

(65) Prior Publication Data

US 2024/0328365 A1 Oct. 3, 2024

(30) Foreign Application Priority Data

Mar. 31, 2023 (EP) ..................... 23165974

(51) Int. Cl.
| | |
|---|---|
| *F02D 13/02* | (2006.01) |
| *F02B 37/22* | (2006.01) |
| *F02B 75/02* | (2006.01) |
| *F02D 41/00* | (2006.01) |

(52) U.S. Cl.
CPC .......... *F02D 13/0226* (2013.01); *F02B 37/22* (2013.01); *F02B 75/02* (2013.01); *F02D 41/0007* (2013.01); *F02B 2075/027* (2013.01)

(58) Field of Classification Search
CPC ............. F02D 13/0207; F02D 13/0226; F02D 13/0234; F02D 41/0007; F02D 2041/001; F02B 37/22; F02B 75/02; F02B 2075/027
See application file for complete search history.

(56) References Cited

U.S. PATENT DOCUMENTS

| | | |
|---|---|---|
| 2007/0144175 A1 | 6/2007 | Sopko, Jr. et al. |
| 2009/0094978 A1 | 4/2009 | Yamagata et al. |
| 2010/0217504 A1* | 8/2010 | Fujii ............... F01L 1/344 |
| | | 123/90.15 |
| 2015/0204257 A1 | 7/2015 | Osumi |

FOREIGN PATENT DOCUMENTS

JP 2004 068631 A 3/2004

OTHER PUBLICATIONS

Extended European Search Report, European Application No. 24167201.3, mailed Sep. 2, 2024, 10 pages.

(Continued)

*Primary Examiner* — Loren C Edwards
(74) *Attorney, Agent, or Firm* — Sage Patent Group

(57) ABSTRACT

The present disclosure relates to an internal combustion engine system including an internal combustion engine comprising a cylinder; an air guide arranged to guide air to the cylinder; at least one inlet valve adapted to selectively provide a fluid communication between said air guide and said cylinder; and an inlet valve actuation assembly for actuating said at least one inlet valve, said inlet valve actuation assembly being adapted to actuate said at least one inlet valve in accordance with one of at least two lift modes during a combustion cycle of said internal combustion engine. The internal combustion engine system is adapted to be operated in a first operation mode in which said throttle arrangement is arranged in an at least partially closed condition and said inlet valve actuation assembly actuates said at least one inlet valve according to a second of the at least two lift modes.

15 Claims, 8 Drawing Sheets

(56) References Cited

OTHER PUBLICATIONS

Extended European Search Report, European Application No. 23165974.9, mailed Oct. 6, 2023, 11 pages.
Wu Binyang, et al., "Different Exhaust Temperature Management Technologies for Heavy-Duty Diesel Engines with Regard to Thermal Efficiency", Applied Thermal Engineering, Pergamon, Oxford, GB, vol. 186, Jan. 5, 2021, 11 pages.

* cited by examiner

INTERNAL COMBUSTION ENGINE SYSTEM

CROSS REFERENCE TO RELATED APPLICATIONS

This application claims priority to European Patent Application No. 23165974.9, filed on Mar. 31, 2023, the disclosure and content of which is incorporated by reference herein in its entirety.

TECHNICAL FIELD

The disclosure relates generally to an internal combustion engine system and a method for operating an internal combustion engine system. The disclosure can be applied to heavy-duty vehicles, such as trucks, buses, and construction equipment, among other vehicle types. Although the disclosure may be described with respect to a truck, the disclosure is not restricted to any particular vehicle.

BACKGROUND

For an internal combustion engine system, it may be desired to control the exhaust gases leaving the internal combustion engine. For instance, it may be desired to control the exhaust gases such that an exhaust aftertreatment system connected to, or forming part of, the internal combustion engine system operates under desired conditions.

SUMMARY

According to a first aspect of the disclosure, an internal combustion engine system comprising:
an internal combustion engine comprising a cylinder;
an air guide arranged to guide air to the cylinder;
at least one inlet valve adapted to selectively provide a fluid communication between the air guide and the cylinder;
an inlet valve actuation assembly for actuating the at least one inlet valve, the inlet valve actuation assembly being adapted to actuate the at least one inlet valve in accordance with one of at least two lift modes during a combustion cycle of the internal combustion engine, wherein:
a first lift mode of the at least one inlet valve is associated with: a first opening instance, at which the at least one inlet valve becomes open from a closed position; a first maximum lift, and a first closing instance, at which the at least one inlet valve becomes closed;
a second lift mode of the at least one inlet valve is associated with: a second opening instance, at which the at least one inlet valve becomes open from a closed position; a second maximum lift, and a second closing instance, at which the at least one inlet valve becomes closed, wherein
the first opening instance is equal to the second opening instance; the first maximum lift is equal to the second maximum lift, and the second closing instance occurs later in the combustion cycle than the first closing instance;
a turbo comprising a turbine in fluid communication with the cylinder, the turbine comprising a turbine wheel;
a throttle arrangement arranged between the cylinder and the turbine wheel, as seen in a direction of flow from the cylinder to the turbine wheel, the throttle arrangement being adapted to assume a plurality of different conditions for throttling exhaust gas from the cylinder to the turbine wheel, the plurality of different conditions comprising an open condition with a smallest throttling of the exhaust gas amongst the conditions as well as an at least partially closed condition associated with a throttling being larger than the smallest throttling, the internal combustion engine system being adapted to be operated in a first operation mode in which the throttle arrangement is arranged in the at least partially closed condition and the inlet valve actuation assembly actuates the at least one inlet valve according to the second lift mode.

In some examples, the internal combustion engine system is adapted to be operated in a second operation mode in which the inlet valve actuation assembly actuates the at least one inlet valve according to the first lift mode. Purely by way of example, the internal combustion engine system may be adapted to select which one of the first lift mode and the second lift mode to use.

The internal combustion engine may comprise any number of cylinders. For example, the internal combustion engine may comprise four, six, or eight cylinders. Each inlet valve may selectively provide a fluid communication between an air guide and a single cylinder. Alternatively, multiple valves may be used to provide a fluid communication between an air guide and a single cylinder.

The term "opening instance" may be understood as the instant at which a valve reaches an open condition from a closed condition. The first opening instance being equal to the second opening instance can be understood to mean that the instant that the valve reaches an open condition is the same instant in the combustion cycle, e.g., at the same instant with respect to the intake and compression strokes, for each one of the first and second lift modes.

The term "closing instance" may be understood as the instant that a valve reaches a closed condition from an at least partially open condition. A second closing instance occurring later in the combustion cycle than a first closing instance can be understood to mean that the instant that the valve reaches a closed condition occurs later within the combustion cycle, e.g., later in the intake and compression strokes, in the second instance than in the first instance.

In some examples the inlet valve may have any number of lift modes, for example it is possible to be discretely adjustable, each closing instance comprising a different lift mode. Alternatively, the inlet valve may be continuously adjustable, different lift modes being possible with different valve closing times occurring at any instance between that of the first inlet lift mode and second inlet lift mode.

The first aspect of the disclosure may seek to control the exhaust gas in an appropriate manner. For instance, the first aspect of the present disclosure implies that an exhaust mass flow as well as an exhaust temperature may be controlled. A technical benefit may include an increased versatility in the control of exhaust gas characteristics. Moreover, the fact that the first maximum lift is equal to the second maximum lift implies that e.g., a mass flow through the cylinder may be varied in a straightforward manner without necessarily requiring a complex inlet valve actuation assembly.

In some examples, the first closing instance occurs at a first crank angle for the cylinder and the second closing instance occurs at a second crank angle for the cylinder. A technical benefit may include controlling a gas mass flow through the engine.

In some examples, a crank angle difference between the second crank angle and the first crank angle is in the range of 30°-60°, preferably in the range of 40°-50°.

In some examples, the internal combustion engine is a four stroke engine, the engine comprising a piston adapted to move in the cylinder during an intake stroke ending at a bottom dead center at a bottom dead center crank angle for the piston.

In some examples, the bottom dead center crank angle occurs on or before the first crank angle, optionally a difference between the first crank angle and the bottom dead center crank angle being in the range of 0°-20°, alternatively in the range of 0°-10°.

In some examples, the bottom dead center crank angle occurs before the second crank angle, a difference between the second crank angle and the bottom dead center crank angle being in the range of 30°-60°, preferably in the range of 40°-50°. A technical benefit may include increasing mass flow through the engine by allowing air flow into the cylinder after bottom dead center. To this end, it should be noted that the second crank angle is such that the difference between the second crank angle and the bottom dead center crank angle is in the range of 30°-60°, preferably in the range of 40°-50°, implies that the least one inlet valve is open when the pressure in the air guide may be higher than the pressure in the cylinder. This in turn implies that the second crank angle is such that air may still be fed to the cylinder rather than being pushed from the cylinder back to the air guide when the least one inlet valve is open. The above indicates the above-mentioned increase in mass flow through the engine.

In some examples, a valve lift of the at least one inlet valve when the piston is at the bottom dead center in the second lift mode is in the range of 1% to 10% of the second maximum lift. A technical benefit may include increasing mass flow through the engine by allowing air flow into the cylinder at bottom dead center. To this end, though purely by way of example, a valve lift of the at least one inlet valve within the range presented above when the piston is at the bottom dead center implies that an appropriate amount of air may be allowed to pass the at least one inlet valve towards the cylinder even when the piston is at the bottom dead center, thereby implying an appropriate mass flow through the through the engine. As a non-limiting example, the above-mentioned technical may be pronounced for a two stage charging system.

In some examples, the internal combustion engine system comprises an exhaust guide assembly arranged to guide exhaust gas from the cylinder, wherein the throttle arrangement comprises a pre-turbine throttle arranged at least partially in a portion of the exhaust guide assembly, the pre-turbine throttle being adapted to assume the plurality of different conditions resulting in different opening percentages of the portion of the exhaust guide assembly, the open condition being associated with a largest opening percentage amongst the conditions and the at least partially closed condition being associated with an opening percentage being smaller than the largest opening percentage. A technical benefit may include an appropriate control of the exhaust gas flow.

In some examples, the pre-turbine throttle comprises a pivotable flap, preferably a continuously pivotable flap, pivotable between the open condition and an end condition, preferably the end condition resulting in that the portion of the exhaust guide assembly is fully closed. The pivotable flap may comprise a butterfly valve. A technical benefit May include that the throttle allows for an appropriate control of the exhaust gas flow.

In some examples, the turbo comprises a plurality of guide vanes that are adapted to move so as to control the throttling of the exhaust gas. Purely by way of example, the plurality of guide vanes may be pivoted such that a size of a gap between two adjacent guide vanes is adjusted. A technical benefit may include controlling the pressure of the flow through the turbine.

In some examples, the internal combustion engine system further comprises a control system for controlling the inlet valve actuation assembly and/or the throttle arrangement. The control system is adapted to receive at least the following current operating information: an engine torque produced by the internal combustion engine; an engine speed of the internal combustion engine, and exhaust temperature information indicative of a temperature of the exhaust gas from the cylinder. The control system is adapted to issue information to at least one of the inlet valve actuation assembly and the throttle arrangement in response to the current operating information. The information to the inlet valve actuation assembly comprises information relating to a target lift mode and the information to the throttle arrangement relates to a target condition of the throttle arrangement. A technical benefit may include controlling that the characteristics of the internal combustion engine system, such as characteristics of the exhaust gases produced by the internal combustion engine, may be controlled in a desired manner.

In some examples, the control system is adapted to use a set of lift mode maps, each lift mode map being associated with a certain value of the exhaust temperature information and containing information about a predetermined lift mode for a plurality of combinations of values of the engine torque and the engine speed, respectively. The control system is adapted to determine the target lift mode using: the lift mode maps; the engine torque; the engine torque and the exhaust temperature information, of the current operating information. Optionally, the control system is adapted to carry out one or more interpolations within and/or between the set of lift mode maps for determining the target lift mode. A technical benefit may include controlling that e.g. the mass flow through the internal combustion engine may be controlled in a desired manner by choosing an appropriate lift mode on the basis of the current operating conditions.

In some examples, the control system is adapted to use a set of exhaust characteristic maps. Each exhaust characteristic map being associated with a certain value of the exhaust temperature information and containing information about a predetermined exhaust gas characteristic exhaust gases produced by the internal combustion engine system, wherein the exhaust characteristic is an exhaust power or an exhaust gas mass flow, for a plurality of combinations of values of the engine torque and the engine speed. The control system is adapted to determine a target exhaust characteristic using the exhaust characteristic maps; the engine torque; the engine torque and the exhaust temperature information of the current operating information. Optionally, the control system is adapted to carry out one or more interpolations within and/or between the set of exhaust characteristic maps for determining the target exhaust characteristic. A technical benefit may include controlling that e.g. the mass flow through the internal combustion engine may be controlled in a desired manner by choosing an appropriate target exhaust characteristic on the basis of the current operating conditions.

In some examples, the control system is adapted to use the target exhaust characteristic and to control the condition of the throttle arrangement using a closed loop using the target exhaust characteristic as a set point value for the closed loop control. A technical benefit may include that the throttle arrangement is controlled in an appropriate manner.

In some examples, the internal combustion engine system comprises an exhaust gas temperature sensor for sensing the temperature of exhaust gas downstream the cylinder. The temperature sensor is in communication with the control system such that the control system can determine the exhaust temperature information on the basis of information sensed from the exhaust gas temperature sensor. Optionally the exhaust gas temperature sensor is adapted to sense the temperature of exhaust gas at a position downstream the turbine. The exhaust gas temperature sensor may be an existing sensor or may be purposed solely for collecting data used for controlling the inlet valve actuation assembly and the throttle arrangement. A technical benefit may include providing accurate exhaust temperature data for control of the system.

In some examples, the internal combustion engine system further comprises a control system for controlling the inlet valve actuation assembly and the throttle arrangement, the control system being adapted to use target gas mass flow information indicative of a target gas mass flow of gas passing the throttle arrangement and to issue information to the inlet valve actuation assembly and the throttle arrangement in response to the target gas mass flow information, wherein the information to the inlet valve actuation assembly comprises information as to which lift mode to use and the information to the throttle arrangement being indicative of a condition of the throttle arrangement preferably said target gas mass flow being indicative of a target mass flow rate of exhaust gas passing said throttle arrangement. A technical benefit may include conjoint control of the inlet valve and throttle based on gas mass flow requirements.

In some examples, the control system is adapted to use load information indicative of a current load of the internal combustion engine for determining the target gas mass flow information. In some embodiments, the control system is adapted to issue information to the inlet valve actuation assembly to use the second lift mode in response to determining that the load information is equal to above a predetermined load threshold and to issue information to the inlet valve actuation assembly to use the first lift mode in response to determining that the load information is below the predetermined load threshold. A technical benefit may include an appropriate control of the exhaust gas mass flow.

In some examples, the control system is adapted to use exhaust temperature information indicative of a temperature of the exhaust gas from the cylinder for determining the target gas mass flow information. A technical benefit may include that the system may adapt to current exhaust temperature operating conditions such that e.g., a target exhaust power can be achieved.

In some examples, the control system is further adapted to use at least one of the following:
  ambient temperature information indicative of a temperature ambient of the internal combustion engine system, and
  coolant temperature information indicative of a coolant of the internal combustion engine, for determining the target gas mass flow information. Ambient temperature information may be determined directly using a sensor, by using weather forecast data, or by any other means. The coolant temperature information may be determined directly by a sensor in the coolant flow, indirectly using temperature sensors located on components in contact with the coolant system, or by any other means. A technical benefit may include more accurately determining exhaust temperature data for control of the system.

According to a second aspect of the disclosure, a method for operating an internal combustion engine system, the internal combustion engine system comprising:
  an internal combustion engine comprising a cylinder;
  an air guide arranged to guide air to the cylinder;
  at least one inlet valve adapted to selectively provide a fluid communication between the air guide and the cylinder;
  an inlet valve actuation assembly for actuating the at least one inlet valve, the inlet valve actuation assembly being adapted to actuate the at least one inlet valve in accordance with one of at least two lift modes during a combustion cycle of the internal combustion engine, wherein:
    a first lift mode of the at least one inlet valve is associated with: a first opening instance, at which the at least one inlet valve becomes open from a closed position; a first maximum lift, and a first closing instance, at which the at least one inlet valve becomes closed;
    a second lift mode of the at least one inlet valve is associated with: a second opening instance, at which the at least one inlet valve becomes open from a closed position; a second maximum lift, and a second closing instance, at which the at least one inlet valve becomes closed, of the at least one inlet valve, wherein
    the first opening instance is equal to the second opening instance; the first maximum lift is equal to the second maximum lift, and the second closing instance occurs later in the combustion cycle than the first closing instance;
  a turbo comprising a turbine in fluid communication with the cylinder, the turbine comprising a turbine wheel;
  a throttle arrangement arranged between the cylinder and the turbine wheel, as seen in a direction of flow from the cylinder to the turbine wheel, the throttle arrangement being adapted to assume a plurality of different conditions for throttling exhaust gas from the cylinder to the turbine wheel, the plurality of different conditions comprising an open condition with a smallest throttling of the exhaust gas amongst the conditions as well as an at least partially closed condition associated with a throttling being larger than the smallest throttling,
the method comprising operating the internal combustion engine system in a first operation mode in which the throttle arrangement is arranged in the at least partially closed condition and the inlet valve actuation assembly actuates the at least one inlet valve according to the second lift mode.

The second aspect of the disclosure may seek to control the exhaust gas in an appropriate manner. For instance, the second aspect of the present disclosure implies that an exhaust mass flow as well as an exhaust temperature may be controlled. A technical benefit may include an increased versatility in the control of exhaust gas characteristics.

In some examples, the first closing instance occurs at a first crank angle for the cylinder and the second closing instance occurs at a second crank angle for the cylinder. A technical benefit may include controlling a gas mass flow through the engine.

In some examples, the second crank angle and the first crank angle is in the range of 30°-60°, preferably in the range of 40°-50°.

In some examples, the internal combustion engine is a four stroke engine, the engine comprising a piston adapted to move in the cylinder during an intake stroke ending at a bottom dead center at a bottom dead center crank angle for the piston.

In some examples, the bottom dead center crank angle occurs before the second crank angle, a difference between the second crank angle and the bottom dead center crank angle being in the range of 30°-60°, preferably in the range of 40°-50°. A technical benefit may include increasing mass flow through the engine by allowing air flow into the cylinder after bottom dead center.

In some examples, a valve lift of the at least one inlet valve when the piston is at the bottom dead center in the second lift mode is in the range of 1% to 10% of the second maximum lift. A technical benefit may include increasing mass flow through the engine by allowing air flow into the cylinder at bottom dead center.

In some examples, the internal combustion engine system comprises an exhaust guide assembly arranged to guide exhaust gas from the cylinder, wherein the throttle arrangement comprises a pre-turbine throttle arranged at least partially in a portion of the exhaust guide assembly, the pre-turbine throttle being adapted to assume the plurality of different conditions resulting in different opening percentages of the portion of the exhaust guide assembly, the open condition being associated with a largest opening percentage amongst the conditions and the at least partially closed condition being associated with an opening percentage being smaller than the largest opening percentage. A technical benefit may include an appropriate control of the exhaust gas flow.

In some examples, the pre-turbine throttle comprises a pivotable flap, preferably a continuously pivotable flap, pivotable between the open condition and an end condition, preferably the end condition resulting in that the portion of the exhaust guide assembly is fully closed. A technical benefit may include that the throttle allows for an appropriate control of the exhaust gas flow.

In some examples, the turbo comprises a plurality of guide vanes that are adapted to move so as to control the throttling of the exhaust gas. Purely by way of example, the plurality of guide vanes may be pivoted such that a the size of a gap between two adjacent guide vanes is adjusted. A technical benefit may include controlling the pressure of the flow through the turbo.

In some examples, the method comprises receiving at least the following current operating information: an engine torque produced by the internal combustion engine; an engine speed of the internal combustion engine, and exhaust temperature information indicative of a temperature of the exhaust gas from the cylinder. The method further comprises issuing information to at least one of the inlet valve actuation assembly and the throttle arrangement in response to the current operating information. The information to the inlet valve actuation assembly comprises information relating to a target lift mode and the information to the throttle arrangement relates to a target condition of the throttle arrangement. A technical benefit may include controlling that the characteristics of the internal combustion engine system, such as characteristics of the exhaust gases produced by the internal combustion engine, may be controlled in a desired manner.

In some examples, the method comprises using a set of lift mode maps, each lift mode map being associated with a certain value of the exhaust temperature information and containing information about a predetermined lift mode for a plurality of combinations of values of the engine torque and the engine speed, respectively. The method further comprises determining the target lift mode using: the lift mode maps; the engine torque; the engine torque and the exhaust temperature information, of the current operating information. Optionally, method comprises carrying out one or more interpolations within and/or between the set of lift mode maps for determining the target lift mode. A technical benefit may include controlling that e.g. the mass flow through the internal combustion engine may be controlled in a desired manner by choosing an appropriate lift mode.

In some examples, the method comprises using a set of exhaust characteristic maps. Each exhaust characteristic map is associated with a certain value of the exhaust temperature information and containing information about a predetermined exhaust gas characteristic exhaust gases produced by the internal combustion engine system, wherein the exhaust characteristic is an exhaust power or an exhaust gas mass flow, for a plurality of combinations of values of the engine torque and the engine speed. The method comprises determining a target exhaust characteristic using the exhaust characteristic maps; the engine torque; the engine torque and the exhaust temperature information of the current operating information. Optionally, the method comprises carrying out one or more interpolations within and/or between the set of exhaust characteristic maps for determining the target exhaust characteristic. A technical benefit may include controlling that e.g. the mass flow through the internal combustion engine may be controlled in a desired manner by choosing an appropriate target exhaust characteristic.

In some examples, the method comprises using the target exhaust characteristic and controlling the condition of the throttle arrangement using a closed loop using the target exhaust characteristic as a set point value for the closed loop control. A technical benefit may include that the throttle arrangement is controlled in an appropriate manner.

In some examples, the method comprises using target gas mass flow information indicative of a target gas mass flow of gas passing the throttle arrangement and issuing information to the inlet valve actuation assembly and the throttle arrangement in response to the target gas mass flow information, wherein the information to the inlet valve actuation assembly comprises information as to which lift mode to use and the information to the throttle arrangement being indicative of a condition of the throttle arrangement. A technical benefit may include conjoint control of the inlet valve and throttle based on gas mass flow requirements.

In some examples, the method comprises using load information indicative of a current load of the internal combustion engine for determining the target gas mass flow information. In some embodiments, the method comprises using the second lift mode in response to determining that the load information is equal to or above a predetermined load threshold and using the first lift mode in response to determining that the load information is below the predetermined load threshold. A technical benefit may include an appropriate control of the exhaust gas mass flow.

In some examples, the method comprises using exhaust temperature information indicative of a temperature of exhaust gas from the cylinder for determining the target gas mass flow information. A technical benefit may include that the system may adapt to current exhaust temperature operating conditions such that e.g., a target exhaust power can be achieved.

In some examples, the internal combustion engine system comprises an exhaust gas temperature sensor for sensing the temperature of exhaust gas downstream the cylinder, the temperature sensor being in communication with the control system such that the control system can determine the exhaust temperature information on the basis of information sensed from the exhaust gas temperature sensor. By way of example, the exhaust gas temperature sensor is adapted to sense the temperature of exhaust gas at a position downstream the turbine. A technical benefit may include providing accurate exhaust temperature data for control of the system.

In some examples, the method further comprises using at least one of the following:

ambient temperature information indicative of a temperature ambient of the internal combustion engine system, and coolant temperature information indicative of a coolant of the internal combustion engine, for determining the target gas mass flow information. A technical benefit may include more accurately determining exhaust temperature data for control of the system.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

For an internal combustion engine system, it may be desired to control the exhaust gases leaving the internal combustion engine. For instance, it may be desired to control the exhaust gases such that an exhaust aftertreatment system connected to, or forming part of, the internal combustion engine system operates under desired conditions.

The disclosure may seek to control the exhaust gas in an appropriate manner. For instance, exhaust mass flow as well as an exhaust temperature may be controlled. A technical benefit may include an increased versatility in the control of exhaust gas characteristics.

Figure 1:
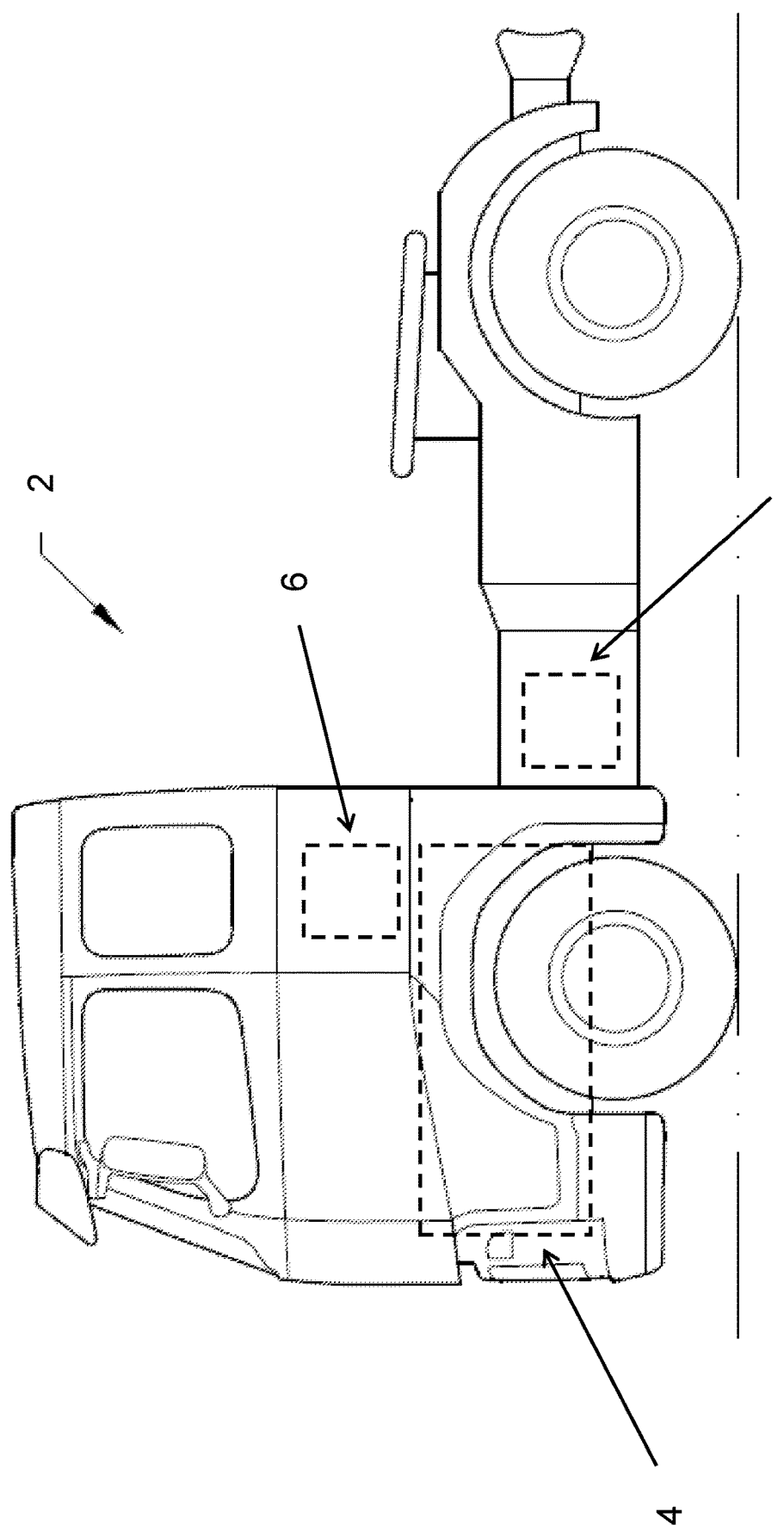
FIG. 1 is an exemplary embodiment of the present disclosure, comprising a side view of a vehicle, in the form of a truck, according to an example.

FIG. 1 is an exemplary embodiment of the present disclosure, comprising a side view of a vehicle 2, in the form of a truck, according to an example.

Whilst the shown embodiment illustrates a truck, the disclosure may relate to any vehicle, such as a car, bus, industrial vehicle, boat, ship, etc., wherein motive power may be derived from an internal combustion engine.

The vehicle 2 comprises an internal combustion engine system 4. Moreover, the vehicle 2 may also comprise a control system 6.

The vehicle 2 may further comprise an exhaust aftertreatment system 8. As a non-limiting example, the exhaust aftertreatment system 8 may comprise a catalyst (not shown) and/or a particle filter (not shown). Purely by way of example, the exhaust aftertreatment system 8 may form part of the internal combustion engine system 4 and this applies to any example of the internal combustion engine system 4 of the present disclosure. Performance of exhaust aftertreatment systems may be dependent on temperature. As such, the disclosure may be aimed at controlling the internal combustion engine system 4 such that a sufficiently high exhaust aftertreatment system temperature may be achieved. Achieving the necessary temperature may be necessary for example at cold start, at low ambient temperatures, and at low engine loads.

Figure 2:
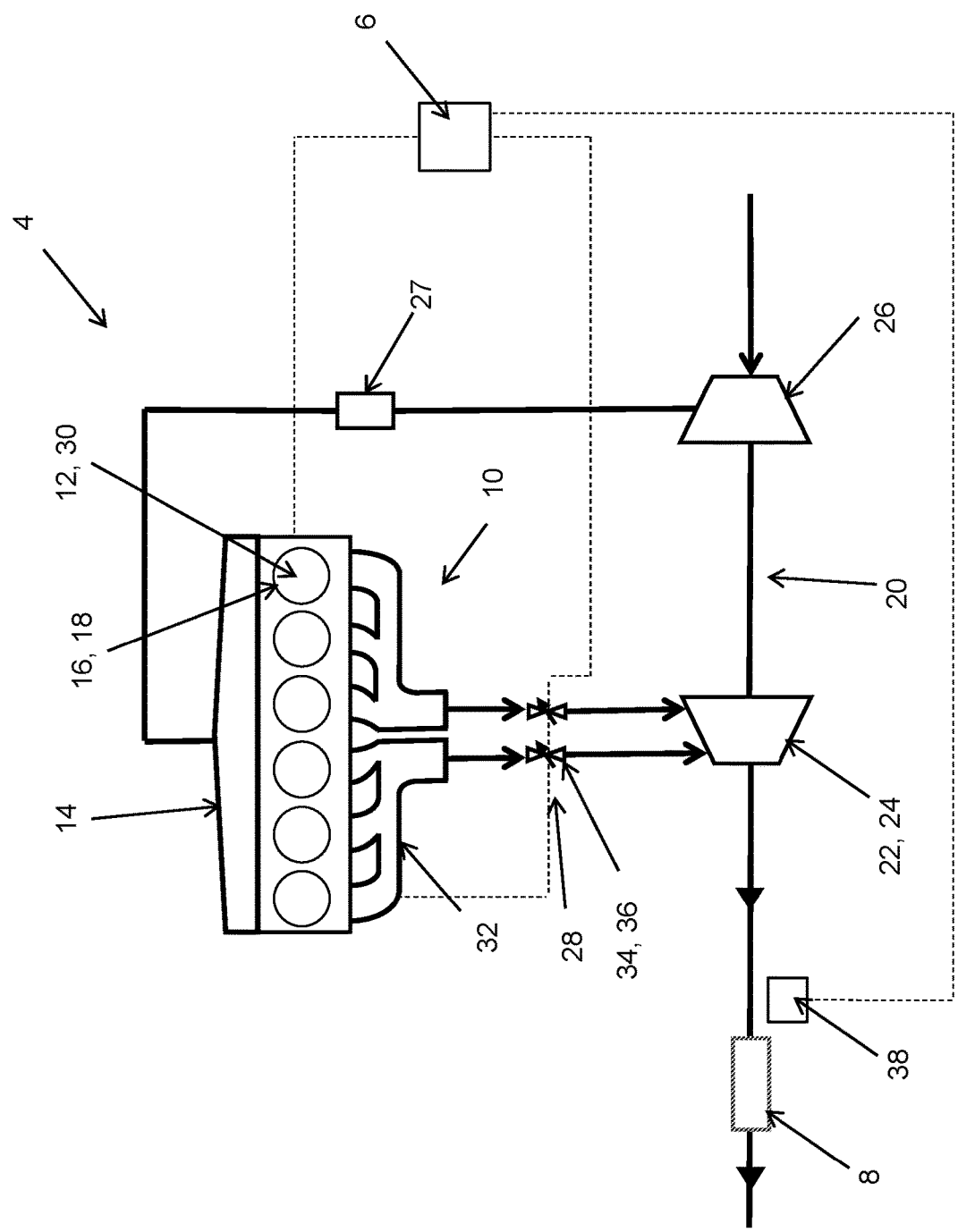
FIG. 2 shows an internal combustion engine system, according to an example.

FIG. 2 shows an example of an internal combustion engine system 4. Purely by way of example, the FIG. 2 internal combustion engine system 4 may be used in the vehicle 2 of FIG. 1.

The internal combustion engine system 4 comprises an internal combustion engine 10. The internal combustion engine 10 comprises a cylinder 12. In the shown embodiment the internal combustion engine 10 comprises six cylinders 12, however the combustion engine 101 may comprise any number of cylinders 12, for example the internal combustion engine may comprise four, six, or eight cylinders 12.

The internal combustion engine system 4 further comprises an air guide 14 arranged to guide air to the cylinder 12. As a non-limiting example, the air guide may comprise, or even be constituted by, an air intake manifold.

The internal combustion engine system 4 further comprises at least one inlet valve 16 adapted to selectively provide a fluid communication between the air guide 14 and the cylinder 12. In the shown example, each inlet valve 16 may selectively provide a fluid communication between the air guide 14 and a single cylinder 12. Alternatively, multiple inlet valves 16 may be used to provide a fluid communication between the air guide 14 and a single cylinder 12.

The internal combustion engine system 4 further comprises an inlet valve actuation assembly 18 for actuating the at least one inlet valve 16. The inlet valve actuation assembly 18 is adapted to actuate the at least one inlet valve 16 in accordance with one of at least two lift modes during a combustion cycle of the internal combustion engine. An example inlet valve actuation assembly 18 is presented hereinbelow with reference to FIG. 6.

A first lift mode of the at least one inlet valve 16 is associated with a first maximum lift and a first closing instance, at which the at least one inlet valve 16 becomes closed.

A second lift mode of the at least one inlet valve 16 is associated with a second maximum lift and a second closing instance, at which the at least one inlet valve 16 becomes closed.

The first maximum lift is equal to the second maximum lift and the second closing instance occurs later in the combustion cycle than the first closing instance. The fact that the first maximum lift is equal to the second maximum lift implies that e.g., a mass flow through the cylinder may be varied in a straightforward manner without necessarily requiring a complex inlet valve actuation assembly. This will be elaborated on further hereinbelow.

Figure 3:
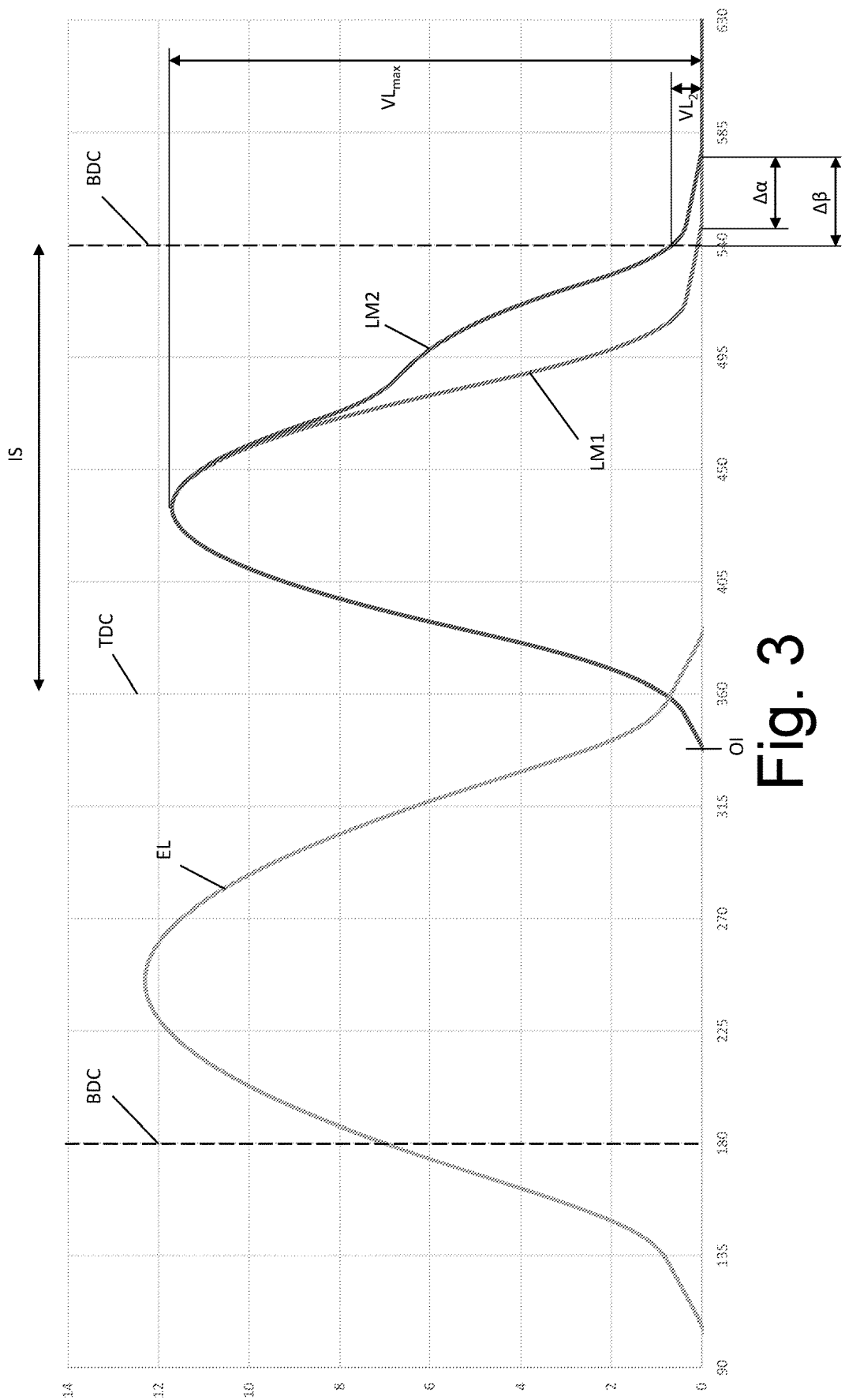
FIG. 3 is a graph showing valve openings for a single combustion cycle in an internal combustion engine system.

FIG. 3 is a graph showing valve openings for a single combustion cycle in an example of an internal combustion engine system 4, such as the system presented above with relation to FIG. 2. The x-axis of the graph shows crank angle, in degrees, and the y-axis relates to valve lift, for instance in mm. The graph shows three curves the first showing the exhaust valve lift EL, and the second and third showing the inlet valve in the first lift mode LM1 and the second lift mode LM2, respectively. Also marked are the bottom dead center BDC and top dead center TDC crank angles, represented by a pair of dashed lines BDC and a solid line TDC, respectively, extending in the y-axis. Moreover, as indicated in FIG. 3, the first maximum lift is equal to the second maximum lift, which maximum lifts are indicated by $VL_{max}$ in FIG. 3. Additionally, the first lift mode LM1 of the at least one inlet valve 16 is associated with a first opening instance, at which the at least one inlet valve 16 becomes open from a closed position. Further, the second lift mode of the at least one inlet valve 16 is associated with a second opening instance, at which the at least one inlet valve 16 becomes open from a closed position. The first opening instance is equal to the second opening instance, which opening instances are indicated by OI in FIG. 3.

The inlet valve may have any number of lift modes, for example it is possible to be discretely adjustable, each closing instance comprising a different lift mode. Alternatively, the inlet valve may be continuously adjustable, different lift modes being possible with different valve closing times occurring at any instance between that of the first inlet lift mode LM1 and second inlet lift mode LM2. However, generally, each lift mode may be associated with an opening instance and a maximum lift, respectively, being equal to opening instance and a maximum lift of each one of the other lift mode(s) available for the inlet valve 16.

Reverting to FIG. 2, the internal combustion engine system 4 further comprises a turbo 20 comprising a turbine 22 in fluid communication with the cylinder 12, the turbine 22 comprising a turbine wheel 24. Moreover, though purely by way of example, the internal combustion engine system 4 may comprise a compressor 26 which is mechanically connected to the turbine 22. Additionally, as a non-limiting example, the internal combustion engine system 4 may comprise a charge air cooler 27 located between the compressor 26 and the air guide 14, as seen in a direction of flow from the compressor 26 to the air guide 14.

The internal combustion engine system 4 further comprises a throttle arrangement 28 arranged between the cylinder 12 and the turbine wheel 24, as seen in a direction of flow from the cylinder 12 to the turbine wheel 24. The throttle arrangement 28 is adapted to assume a plurality of different conditions for throttling exhaust gas from the cylinder 12 to the turbine wheel 24, the plurality of different conditions comprising an open condition with a smallest throttling of the exhaust gas amongst the conditions as well as an at least partially closed condition associated with a throttling being larger than the smallest throttling, The internal combustion engine system 4 may be adapted to be operated in a first operation mode in which the throttle arrangement 28 is arranged in the at least partially closed condition and the inlet valve actuation assembly 18 actuates the at least one inlet valve 16 according to the second lift mode LM2, see FIG. 3.

Moreover, though purely by way of example, the internal combustion engine system 4 may be adapted to be operated in a second operation mode in which the inlet valve actuation assembly 18 actuates the at least one inlet valve 16 according to the first lift mode LM1, see e.g., FIG. 3. Purely by way of example, the internal combustion engine system 4 may be adapted to select which one of the first lift mode and the second lift mode to use as will be exemplified below.

As shown in FIG. 3 the first closing instance may occur at a first crank angle for the cylinder 12 and the second closing instance may occur at a second crank angle for the cylinder 12.

A crank angle difference $\Delta\alpha$ between the second crank angle and the first crank angle is shown to be 40°. In alternative examples the crank angle difference between the second crank angle and the first crank angle may be in the range of 30°-60°, preferably in the range of 40°-50°.

The internal combustion engine 10 may comprise a four stroke engine, the engine comprising a piston 111 adapted to move in the cylinder 12 during an intake stroke IS ending at a bottom dead center BDC at a bottom dead center crank angle for the piston 30. FIG. 3 illustrates two instances bottom dead center BDC wherein the bottom dead center BDC ending the intake stroke IS occurs at a crank angle of 540°.

Purely by way of example, the bottom dead center crank angle may occur on or before the first crank angle. By way of example only, a difference between the first crank angle and the bottom dead center crank angle may be in the range of 0°-20°, alternatively in the range of 0°-10°.

The bottom dead center crank angle is shown to occur before the second crank angle, a difference $\Delta\beta$ between the second crank angle and the bottom dead center crank angle being approximately 50° in the FIG. 3 example. In alternative examples, the difference between the second crank angle and the bottom dead center crank angle may be in the range of 30°-60°, preferably in the range of 40°-50°.

A valve lift $VL_2$ of the at least one inlet valve 16 when the piston 30 is at the bottom dead center in the second lift mode is shown to be approximately 8.5% of the second maximum lift $VL_{max}$. In alternative examples the valve lift $VL_2$ of the at least one inlet valve 16 when the piston 30 is at the bottom dead center in the second lift mode may be in the range of 1% to 10% of the second maximum lift $VL_{max}$.

The internal combustion engine system 4 further comprises an exhaust guide assembly 32 arranged to guide exhaust gas from the cylinder 12. The throttle arrangement 28 may comprise a pre-turbine throttle 34 arranged at least partially in a portion of the exhaust guide assembly 32, the pre-turbine throttle 34 being adapted to assume the plurality of different conditions resulting in different opening percentages of the portion of the exhaust guide assembly 32, the open condition being associated with a largest opening percentage amongst the conditions and the at least partially closed condition being associated with an opening percentage being smaller than the largest opening percentage. In the shown example, the exhaust guide assembly 32 is split into two channels each comprising a single pre-turbine throttle 34. Alternatively, the exhaust guide assembly 32 may form any number of channels, for example one, two, three, or four channels, and pre-turbine throttles 34 may be located in all, or at least one of these channels.

The pre-turbine throttle 34 may comprise a pivotable flap 36, such as a continuously pivotable flap, pivotable between the open condition and an end condition, preferably the end condition resulting in that the portion of the exhaust guide assembly 32 is fully closed.

The internal combustion engine system 4 may further comprise a control system 6 for controlling the inlet valve actuation assembly 18 and the throttle arrangement, the control system 6 may be adapted to use target gas mass flow information indicative of a target gas mass flow of gas passing the throttle arrangement 28 and to issue information to the inlet valve actuation assembly 18 and the throttle arrangement 28 in response to the target gas mass flow information, wherein the information to the inlet valve actuation assembly 18 may comprise information as to which lift mode to use and the information to the throttle arrangement may be indicative of a condition of the throttle arrangement 28.

The control system 6 may be adapted to use load information indicative of a current load of the internal combustion engine for determining the target gas mass flow information. In some embodiments, the control system 6 is adapted to issue information to the inlet valve actuation assembly 18 to use the second lift mode in response to determining that the load information is equal to or above a predetermined load threshold and to issue information to the inlet valve actuation assembly 18 to use the first lift mode in response to determining that the load information is below the predetermined load threshold.

The control system 6 may be adapted to use exhaust temperature information indicative of a temperature of the exhaust gas from the cylinder 12 for determining the target gas mass flow information.

In the shown example, the internal combustion engine system 4 comprises an exhaust gas temperature sensor 38 for sensing the temperature of exhaust gas downstream the cylinder 12, the temperature sensor 38 being in communication with the control system 6 such that the control system 6 can determine the exhaust temperature information on the basis of information sensed from the exhaust gas temperature sensor 38. The exhaust gas temperature sensor 38 may be an existing sensor or may be purposed solely for collecting data used for controlling the inlet valve actuation assembly 18 and the throttle arrangement 28. By way of example, the exhaust gas temperature sensor 38 may be adapted to sense the temperature of exhaust gas at a position downstream the turbine 22.

Optionally, the control system 6 may be adapted to use ambient temperature information indicative of a temperature ambient of the internal combustion engine system and/or coolant temperature information indicative of a coolant of the internal combustion engine, in combination with the exhaust temperature information, for determining the target gas mass flow information. Ambient temperature information may be determined directly using a sensor, by using weather forecast data, or by any other means. The coolant temperature information may be determined directly by a sensor in the coolant flow, indirectly using temperature sensors located on components in contact with the coolant system, or by any other means.

Figure 4:
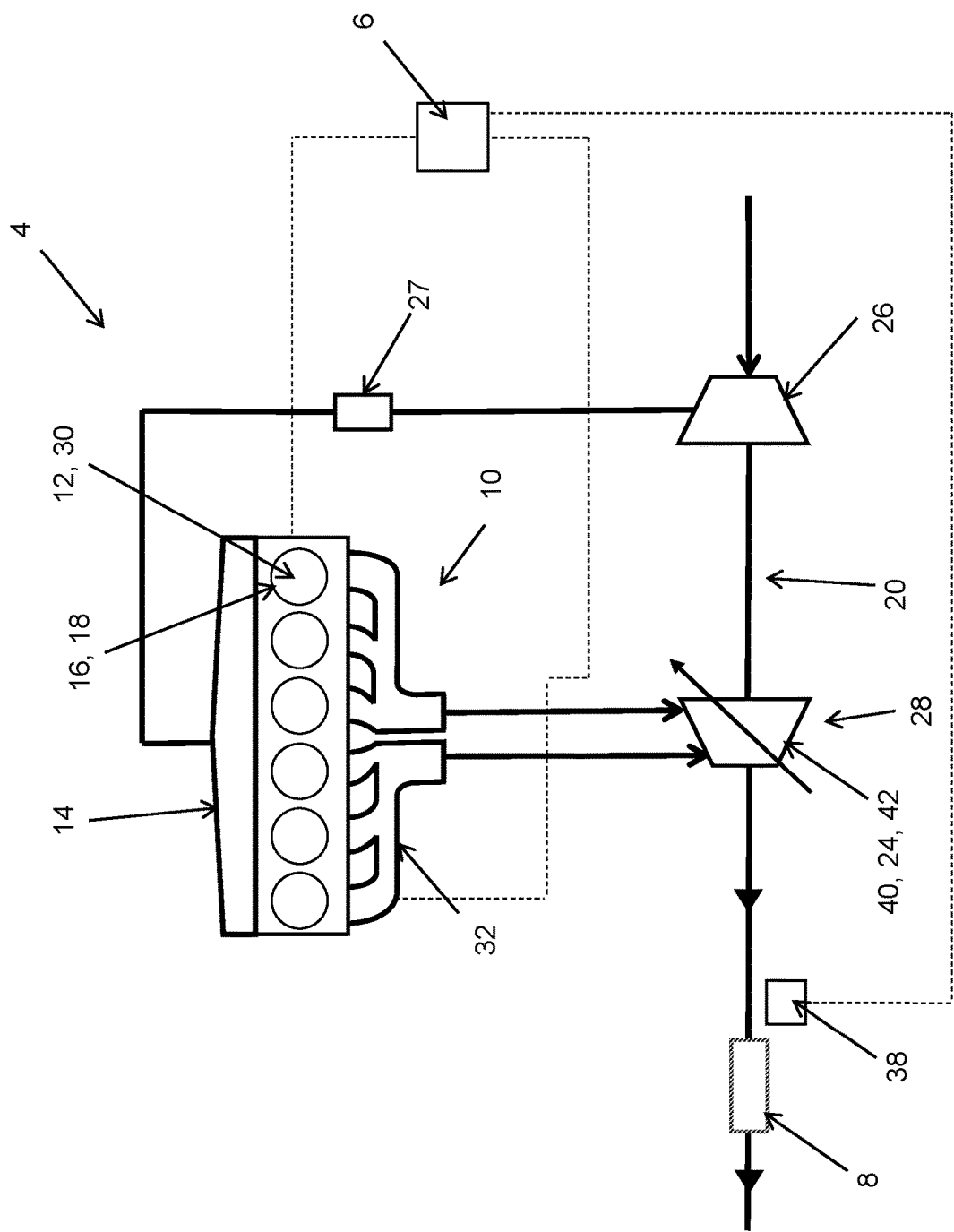
FIG. 4 shows an internal combustion engine system, according to an example.

FIG. 4 is another example of the internal combustion engine system 4. The internal combustion engine system 4 illustrated in FIG. 4 differs from that shown in FIG. 2 in that the turbo 20 comprises a variable geometry turbine 40 in fluid communication with the cylinder 12, the variable geometry turbine 40 comprising a turbine wheel 24.

The turbo 20 comprises a plurality of guide vanes 42 that are adapted to move so as to control the throttling of the exhaust gas. As such, in the FIG. 4 example of the internal combustion engine system 4, the variable geometry turbine 40 is an example implementation of the throttle arrangement 28.

The internal combustion engine system 4 exemplified in FIG. 4 may be adapted to be operated in a first operation mode in which the throttle arrangement 28 is arranged in the at least partially closed condition and the inlet valve actuation assembly 18 actuates the at least one inlet valve 16 according to the second lift mode LM2, see FIG. 3. As such, the FIG. 4 internal combustion engine system 4 may be adapted to be operated in a condition in which the guide vanes 42 are at least partially closed, as a consequence of which the throttle arrangement 28 is arranged in an at least partially closed condition, and the inlet valve actuation assembly 18 actuates the at least one inlet valve 16 according to the second lift mode.

Figure 5:
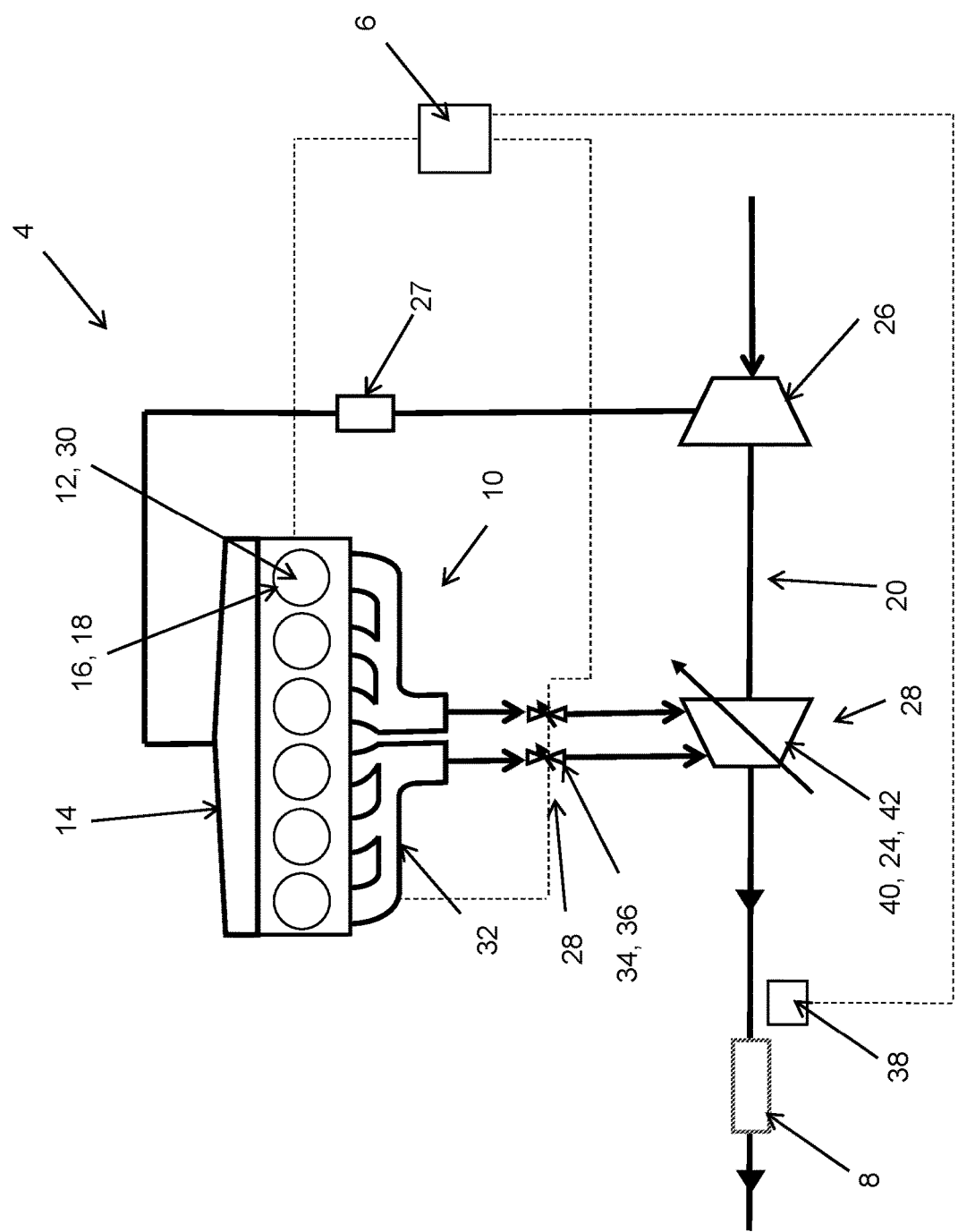
FIG. 5 shows an internal combustion engine system, according to an example.

For the sake of completeness, it should be noted that it is also envisaged that examples of the internal combustion engine system 4 may comprise more than one component implementing the throttle arrangement 28. To this end, reference is made to FIG. 5 illustrating an example of the internal combustion engine system 4 in which the throttle arrangement 28 comprises a pre-turbine throttle 34 as well as the variable geometry turbine 40. Moreover, the internal combustion engine system 4 exemplified in FIG. 5 may be adapted to be operated in a first operation mode in which the throttle arrangement 28 is arranged in the at least partially closed condition, wherein each one or both of the pre-turbine throttle 34 and the variable geometry turbine 40 is in an at least partially closed condition, and the inlet valve actuation assembly 18 actuates the at least one inlet valve 16 according to the second lift mode LM2, reference again being made to FIG. 3.

Figure 6:
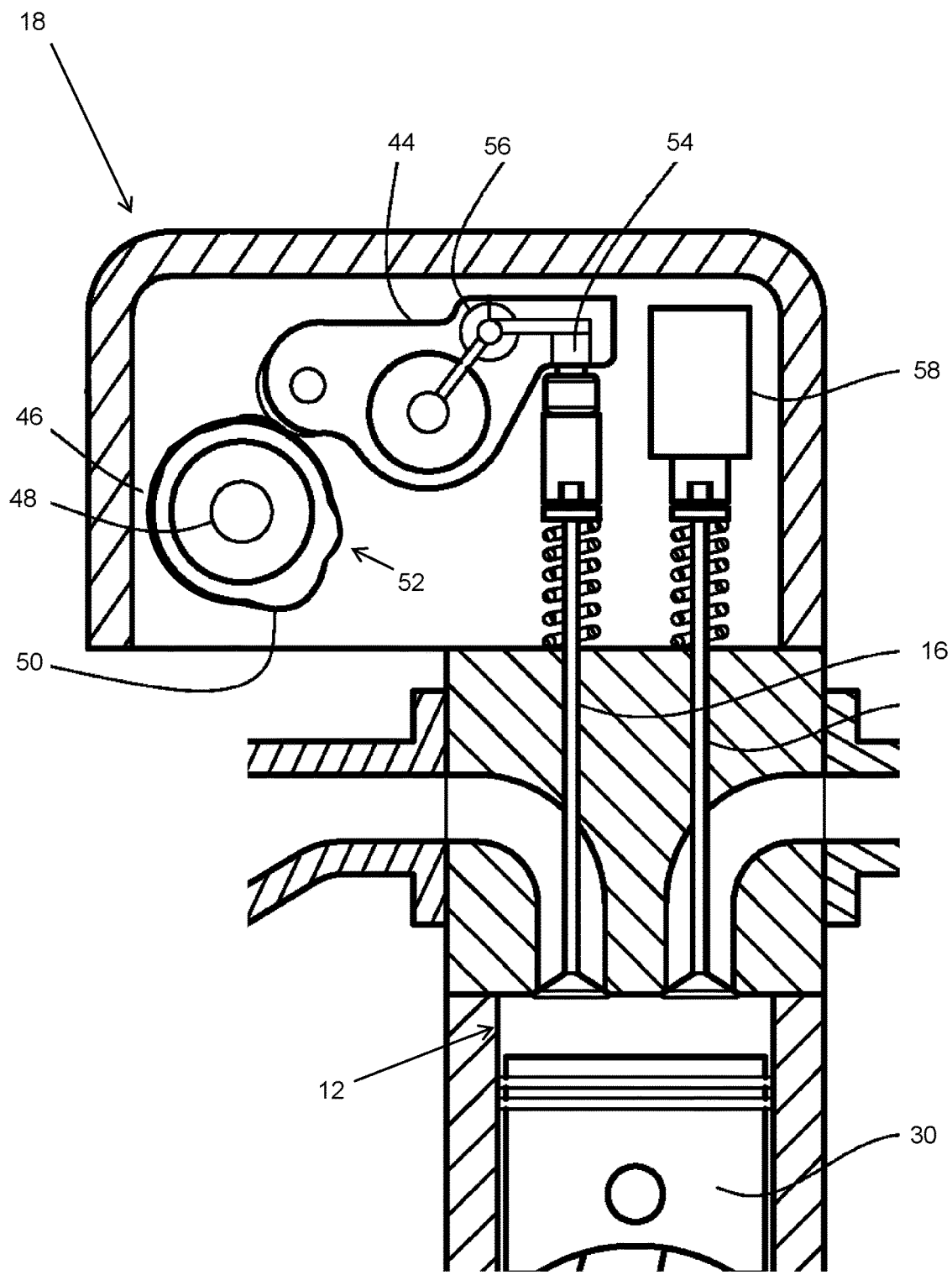
FIG. 6 shows an example of an inlet valve actuation assembly.

FIG. 6 illustrates an example of the inlet valve actuation assembly 18. The inlet valve actuation assembly 18 exemplified in FIG. 6 comprises for each cylinder 12 a rocker arm 44 arranged to pivot by contact at one end with a respective cam lobe 46 of a cam shaft 48 to actuate the inlet valve 16. The cam lobe 46 presents a relatively large main nose 50, and a relatively small nose 52. When the inlet valve actuation assembly 18 operates in the first lift mode, a distance is provided between the rocker arm 44 and the relatively small nose 52. Therefore, the relatively small nose 52 does not provide any inlet valve actuation in the first lift mode. However, in the second lift mode, the rocker arm 44 is in contact with the relatively small nose 52, which provides the movement of the inlet valve in a manner presented above with reference to FIG. 3, see curve LM2 thereof.

The selective engagement of the relatively small nose 52 may be provided by a hydraulic piston 54 at an end of the rocker arm 44 opposite to the end at which the rocker arm 44 is in contact with the cam lobe 46. The hydraulic piston 54 may be controlled by a hydraulic conduit system and a control valve 56 in each rocker arm 44. Purely by way of example, the control valve 56 may be controllable by the above-mentioned control system 6. Moreover, purely by way of example, FIG. 6 also illustrates an exhaust valve 56.

It should be noted that the FIG. 6 implementation of the inlet valve actuation assembly 18 is only one example of a possible implementation and that other implementations of the inlet valve actuation assembly 18 are also envisaged. Purely by way of example, the inlet valve actuation assembly 18 may comprise an electric actuator (not shown) adapted to actuate the at least one inlet valve 16 in the at least two lift modes.

Figure 7:
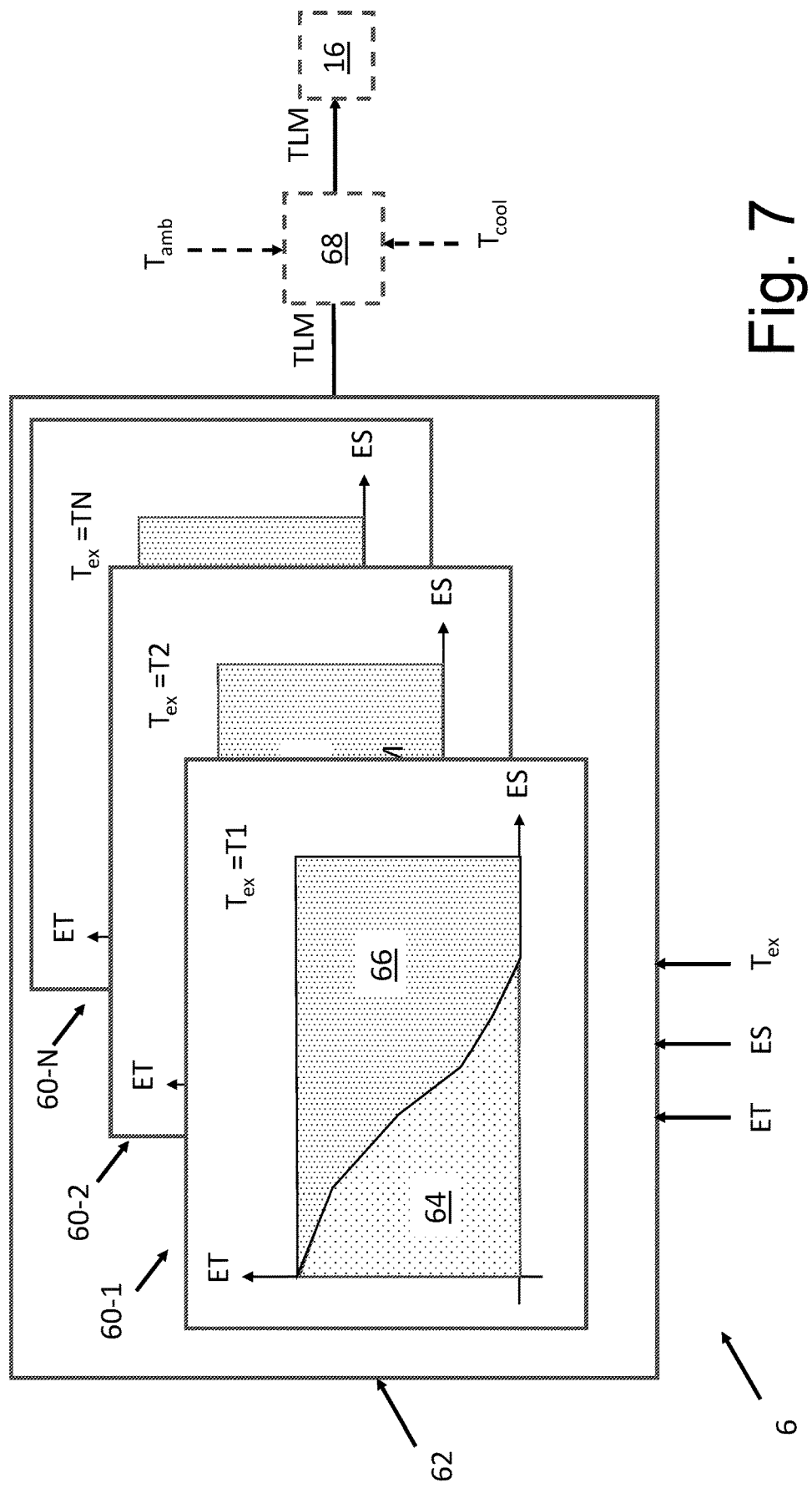
FIG. 7 shows an example of a portion of a control system.
Figure 8:
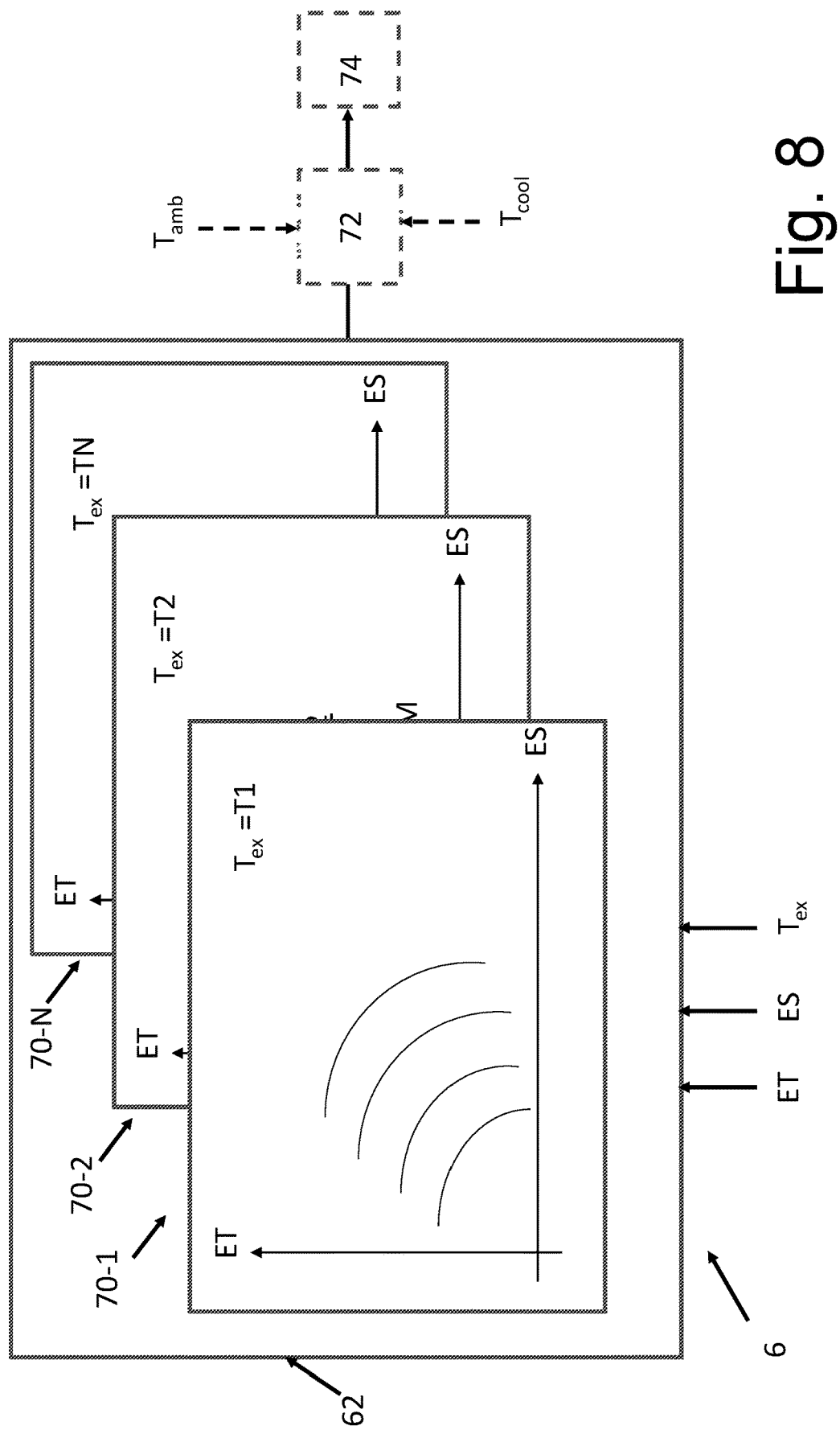
FIG. 8 shows an example of a portion of a control system.

Each one of FIG. 7 and FIG. 8 illustrates portions of a control system 6 which may form part of the internal combustion engine system 4 and which is adapted to control the inlet valve actuation assembly 18 and/or the throttle arrangement 28. As indicated in each one of FIG. 7 and FIG. 8, the control system 6 is adapted to receive at least the following current operating information: an engine torque ET produced by the internal combustion engine 10 (see e.g.

FIG. 2); an engine speed ES of the internal combustion engine 10 (see e.g. FIG. 2), and an exhaust temperature information $T_{ex}$ indicative of a temperature of the exhaust gas from the cylinder 12 (see e.g. FIG. 2). Purely by way of example, each one of the engine torque ET and the engine speed ES may be determined using one or more sensors (not shown) connected to the internal combustion engine 10. Moreover, as a non-limiting example, the exhaust temperature information $T_{ex}$ may be determined using for instance the exhaust gas temperature sensor 38 mentioned above.

Moreover, the control system 6 exemplified in each one of FIG. 7 and FIG. 8 is adapted to issue information to at least one of the inlet valve actuation assembly 18 (see e.g., FIG. 2) and the throttle arrangement 28 (see e.g., FIG. 2) in response to the current operating information. The information to the inlet valve actuation assembly 18 comprises information relating to a target lift mode TLM and the information to the throttle arrangement 28 relates to a target condition of the throttle arrangement 28.

To this end, FIG. 7 illustrates a portion of the control system 6 which is adapted to determine a target lift mode TLM of the at least one inlet valve 16. By way of example only, the FIG. 7 portion of the control system 6 may determine whether the inlet valve actuation assembly 18 should actuate the at least one inlet valve 16 in accordance with the first lift mode LM1 or the second lift mode LM2.

As indicated in FIG. 7, the control system 6 may be adapted to use a set of lift mode maps 60-1, 60-2, . . . 60-N. Each lift mode map 60-1, 60-2, . . . 60-N is associated with a certain value T1, T2, . . . . TN of the exhaust temperature information $T_{ex}$. Although FIG. 7 illustrates three lift mode maps 60-1, 60-2, . . . 60-N, it is envisaged that the control system may use any number of maps. Purely by way of example, the lift mode maps 60-1, 60-2, . . . 60-N may be stored in a memory 62 of the control system 6. Irrespective of the number of lift mode maps used, each lift mode map 60-1, 60-2, . . . 60-N contains information about a predetermined lift mode, such as whether the first lift mode LM1 or the second lift mode LM2 should be used, for a plurality of combinations of values of the engine torque ET and the engine speed ES, respectively.

To this end, though purely by way of example, the first lift mode map 60-1 illustrated in FIG. 7 has a first area 64 and a second area 66. The first area 64 illustrates combinations of the of values of the engine torque ET and the engine speed ES each one of which being associated with the first lift mode LM1. In a similar vein, the second area 66 illustrates combinations of the values of the engine torque ET and the engine speed ES each one of which being associated with the second lift mode LM2.

Here, it should be noted that the predetermined lift mode may have an impact on the exhaust gas mass flow $\dot{m}_{ex}$. As such, a lift mode map, such as the first lift mode map 60-1, may present information indicative of which predetermined lift mode, e.g., which one of the first lift mode LM1 or the second lift mode LM2, which produces a suitable air mass flow through the engine and consequently an exhaust gas mass flow $\dot{m}_{ex}$. Moreover, for low values of the exhaust temperature information $T_{ex}$, it may be desired not to produce a high exhaust gas mass flow $\dot{m}_{ex}$ since low temperature exhaust gases may cool e.g., the exhaust aftertreatment system 8 (see e.g., FIG. 2) in an undesired manner. As such, though purely by way of example, a lift mode map associated with a low value of the exhaust temperature information $T_{ex}$ may include more combinations of values of the engine torque ET and the engine speed ES, i.e., a larger first area 64, than a lift mode map associated with a higher value of the exhaust temperature information $T_{ex}$.

The control system 6 is adapted to determine the target lift mode TLM, such as which one of the first lift mode LM1 or the second lift mode LM2 to use, using the lift mode maps 60-1, 60-2, . . . 60-N; the engine torque ET; the engine torque ET and the exhaust temperature information $T_{ex}$, of the current operating information. To this end, though purely by way of example, the control system 6 may be adapted to carry out one or more interpolations within and/or between the set of lift mode maps 60-1, 60-2, . . . 60-N for determining the target lift mode TLM.

Moreover, though purely by way of example, as indicated in FIG. 7, the control system 6 may comprise a corrector portion 68. The corrector portion may be adapted to receive the information indicative of the target lift mode TLM determined using the above procedure, i.e., using the above-mentioned lift mode maps 60-1, 60-2, . . . 60-N. Moreover, the corrector portion 68 may be adapted to receive one or more of the following:

ambient temperature information $T_{amb}$ indicative of a temperature ambient of the internal combustion engine system 4, and coolant temperature information $T_{cool}$ indicative of a temperature of a coolant of the internal combustion engine 10.

Moreover, though purely by way of example, the FIG. 7 corrector portion 68 may be adapted to modify the target lift mode TLM in response to one or more of the ambient temperature information $T_{amb}$ and the coolant temperature information $T_{cool}$. To this end, the corrector portion 68 may comprise a look-up table, function or similar indicating when and how a target lift mode TLM determined using the above-mentioned lift mode maps 60-1, 60-2, . . . 60-N should be modified in response to one or more of the ambient temperature information $T_{amb}$ and the coolant temperature information $T_{cool}$.

Purely by way of example, the corrector portion 68 may be such that if the target lift mode TLM determined using the above-mentioned lift mode maps 60-1, 60-2, . . . 60-N indicates that the second lift mode LM2 should be used but the corrector portion 68 receives information indicative of a low ambient temperature information $T_{amb}$ and/or a low coolant temperature information $T_{cool}$, the corrector portion 68 may change the target lift mode TLM to the first lift mode LM1 in order to avoid a high exhaust gas mass flow $\dot{m}_{ex}$ which could for instance result in an undesired cooling of e.g. the exhaust aftertreatment system 8.

FIG. 8 illustrates a portion of the control system 6 which is adapted to determine information to the throttle arrangement 28 being indicative of a target condition of the throttle arrangement 28. As indicated in FIG. 8, the portion of the control system 6 exemplified therein is adapted to use a set of exhaust characteristic maps 70-1, 70-2, . . . , 70-N. Each exhaust characteristic map 70-1, 70-2, . . . , 70-N is associated with a certain value T1, T2, . . . , TN of the exhaust temperature information $T_{ex}$ and containing information about a predetermined exhaust gas characteristic of exhaust gases produced by the internal combustion engine system 4, such as the internal combustion engine 10, wherein the exhaust characteristic is an exhaust power $P_{ex}$ or an exhaust gas mass flow $\dot{m}_{ex}$, for a plurality of combinations of values of the engine torque ET and the engine speed ES. Purely by way of example, the exhaust characteristic map 70-1, 70-2, . . . ,70-N may be stored in a memory 62 of the control system 6.

To this end, though purely by way of example, each exhaust characteristic map, which the first exhaust characteristic map is 70-1 is used as an example in FIG. 8, may comprise a set of iso lines, tabulated data or the like indicative of the predetermined exhaust gas characteristic for a plurality of combinations of values of the engine torque ET and the engine speed ES.

Moreover, the FIG. 8 example of the control system 6 is adapted to determine a target exhaust characteristic using the exhaust characteristic maps: the engine torque ET; the engine torque ET and the exhaust temperature information $T_{ex}$ of the current operating information. To this end, though purely by way of example, the control system 6 may be adapted to carry out one or more interpolations within and/or between the set of exhaust characteristic map 68-1, 68-2, . . . ,68-N for determining the target exhaust characteristic.

Moreover, though purely by way of example, as indicated in FIG. 8, the control system 6 may comprise a corrector portion 72. The corrector portion 72 may be adapted to receive the information indicative of the target exhaust characteristic determined using the above procedure, i.e., using the above-mentioned exhaust characteristic map 70-1, 70-2, . . . ,70-N. Moreover, the corrector portion 72 may be adapted to receive one or more of the following:

ambient temperature information $T_{amb}$ indicative of a temperature ambient of the internal combustion engine system 4, and coolant temperature information $T_{cool}$ indicative of a temperature of a coolant of the internal combustion engine 10.

Furthermore, by way of example only, the FIG. 8 corrector portion 72 may be adapted to modify the target exhaust characteristic in response to one or more of the ambient temperature information $T_{amb}$ and the coolant temperature information $T_{cool}$. To this end, the corrector portion 72 may comprise a look-up table, function or similar indicating when and how a target exhaust characteristic determined using the above-mentioned exhaust characteristic map 70-1, 70-2, . . . , 70-N should be modified in response to one or more of the ambient temperature information $T_{amb}$ and the coolant temperature information $T_{cool}$.

Additionally, as indicated in FIG. 8, irrespective of whether or not the system 6 comprises a corrector portion 72, the control system 6 may be adapted to use the target exhaust characteristic and to control the condition of the throttle arrangement 28 using a closed loop 74 using the target exhaust characteristic as a set point value for the closed loop control.

It should be noted that the above presentation of the internal combustion engine system 4 should also be regarded as disclosing a method for controlling the internal combustion engine system 4, for instance using the control system 6.

Moreover, the present disclosure may be exemplified by any one of the below examples.

Example 1: An internal combustion engine system (4) comprising:

an internal combustion engine (10) comprising a cylinder (12);

an air guide (14) arranged to guide air to the cylinder (12);

at least one inlet valve (16) adapted to selectively provide a fluid communication between said air guide (14) and said cylinder (12);

an inlet valve actuation assembly (18) for actuating said at least one inlet valve (16), said inlet valve actuation assembly (18) being adapted to actuate said at least one inlet valve (16) in accordance with one of at least two lift modes during a combustion cycle of said internal combustion engine (10), wherein:

a first lift mode of said at least one inlet valve (16) is associated with: a first opening instance, at which said at least one inlet valve (16) becomes open from a closed position; a first maximum lift, and a first closing instance, at which said at least one inlet valve (16) becomes closed;

a second lift mode of said at least one inlet valve (16) is associated with: a second opening instance, at which said at least one inlet valve (16) becomes open from a closed position; a second maximum lift, and a second closing instance, at which said at least one inlet valve (16) becomes closed, wherein said first opening instance is equal to said second opening instance; said first maximum lift is equal to said second maximum lift, and said second closing instance occurs later in said combustion cycle than said first closing instance;

a turbo (20) comprising a turbine (22;40) in fluid communication with said cylinder (12), said turbine (22;40) comprising a turbine wheel (24);

a throttle arrangement (28) arranged between said cylinder (12) and said turbine wheel (24), as seen in a direction of flow from said cylinder (12) to said turbine wheel (24), said throttle arrangement (28) being adapted to assume a plurality of different conditions for throttling exhaust gas from said cylinder (12) to said turbine wheel (24), said plurality of different conditions comprising an open condition with a smallest throttling of said exhaust gas amongst said conditions as well as an at least partially closed condition associated with a throttling being larger than said smallest throttling, said internal combustion engine system (4) being adapted to be operated in a first operation mode in which said throttle arrangement (28) is arranged in said at least partially closed condition and said inlet valve actuation assembly (18) actuates said at least one inlet valve (16) according to said second lift mode.

Example 2: The internal combustion engine system (4) of Example 1, wherein said first closing instance occurs at a first crank angle for said cylinder (12) and said second closing instance occurs at a second crank angle for said cylinder (12), optionally a crank angle difference between said second crank angle and said first crank angle is in the range of 30°-60°, preferably in the range of 40°-50°.

Example 3: The internal combustion engine system (4) of Example 2, wherein said internal combustion engine (10) is a four stroke engine, said engine (10) comprising a piston (30) adapted to move in said cylinder (12) during an intake stroke ending at a bottom dead center at a bottom dead center crank angle for said piston (30).

Example 4: The internal combustion engine system (4) of Example 3, wherein said bottom dead center crank angle occurs on or before said first crank angle, preferably a difference between said first crank angle and said bottom dead center crank angle being in the range of 0°-20°, more preferred in the range of 0°-10°.

Example 5: The internal combustion engine system (4) of Example 3 or 4, wherein said bottom dead center crank angle occurs before said second crank angle, a difference between said second crank angle and said bottom dead center crank angle being in the range of 30°-60°, preferably in the range of 40°-50°.

Example 6: The internal combustion engine system (4) of any one of Examples 3 to 5, wherein a valve lift of said at least one inlet valve (16) when said piston (30) is at said bottom dead center in said second lift mode is in the range of 1% to 10% of said second maximum lift.

Example 7: The internal combustion engine system (4) of any one of the preceding Examples, wherein said internal combustion engine system (4) comprises an exhaust guide assembly (32) arranged to guide exhaust gas from said cylinder (12), wherein said throttle arrangement (28) comprises a pre-turbine throttle (34) arranged at least partially in a portion of said exhaust guide assembly (32), said pre-turbine throttle (34) being adapted to assume said plurality of different conditions resulting in different opening percentages of said portion of said exhaust guide assembly (32), said open condition being associated with a largest opening percentage amongst said conditions and said at least partially closed condition being associated with an opening percentage being smaller than said largest opening percentage.

Example 8: The internal combustion engine system (4) of Example 7, wherein said pre-turbine throttle (34) comprises a pivotable flap (36), such as a continuously pivotable flap, pivotable between said open condition and an end condition, preferably said end condition resulting in that said portion of said exhaust guide assembly (32) is fully closed.

Example 9: The internal combustion engine system of any one of the preceding Examples, wherein said turbo (20) comprises a plurality of guide vanes (42) that are adapted to move so as to control the throttling of said exhaust gas.

Example 10: The internal combustion engine system (4) of any one of the preceding Examples, wherein said internal combustion engine system (4) further comprises a control system (6) for controlling said inlet valve actuation assembly (18) and/or said throttle arrangement (28), said control system (6) being adapted to receive at least the following current operating information: an engine torque (ET) produced by said internal combustion engine (10); an engine speed (ES) of said internal combustion engine (10), and an exhaust temperature information ($T_{ex}$) indicative of a temperature of said exhaust gas from said cylinder (12), said control system (6) being adapted to issue information to at least one of said inlet valve actuation assembly (18) and said throttle arrangement (28) in response to said current operating information, said information to said inlet valve actuation assembly (18) comprising information relating to a target lift mode (TLM) and said information to said throttle arrangement (28) relating to a target condition of said throttle arrangement (28).

Example 11: The internal combustion engine system (4) of Example 10, wherein said control system (6) is adapted to use a set of lift mode maps (60-1, 60-2, . . . , 60-N), each lift mode map (60-1, 60-2, . . . , 60-N) being associated with a certain value (T1, T2, . . . , TN) of said exhaust temperature information ($T_{ex}$) and containing information about a predetermined lift mode for a plurality of combinations of values of said engine torque (ET) and said engine speed (ES), respectively, said control system (6) being adapted to determine said target lift mode (TLM) using: said lift mode maps (60-1, 60-2, . . . , 60-N); said engine torque (ET); said engine torque (ET) and said exhaust temperature information ($T_{ex}$), of said current operating information, preferably said control system (6) being adapted to carry out one or more interpolations within and/or between said set of lift mode maps (60-1, 60-2, . . . , 60-N) for determining said target lift mode (TLM).

Example 12: The internal combustion engine system (4) of Example 10 or Example 11, wherein said control system (6) is adapted to use a set of exhaust characteristic maps (70-1, 70-2, . . . , 70-N), each exhaust characteristic map being associated with a certain value (T1, T2, . . . ,TN) of said exhaust temperature information ($T_{ex}$) and containing information about a predetermined exhaust gas characteristic of exhaust gases produced by said internal combustion engine system (4), wherein said exhaust characteristic is an exhaust power or an exhaust gas mass flow, for a plurality of combinations of values of said engine torque (ET) and said engine speed (ES), said control system (6) being adapted to determine a target exhaust characteristic using said exhaust characteristic maps (70-1, 70-2, . . . , 70-N); said engine torque (ET); said engine torque (ET) and said exhaust temperature ($T_{ex}$) information of said current operating information, preferably said control system (6) being adapted to carry out one or more interpolations within and/or between said set of exhaust characteristic maps (70-1, 70-2, . . . , 70-N) for determining said target exhaust characteristic.

Example 13: The internal combustion engine system (4) of Example 12, wherein said control system (6) is adapted to use said target exhaust characteristic and to control the condition of said throttle arrangement (28) using a closed loop (74) using the target exhaust characteristic as a set point value for said closed loop control.

Example 14: The internal combustion engine system (4) of any one of Examples 10-13, wherein said internal combustion engine system (4) comprises an exhaust gas temperature sensor (38) for sensing said temperature of exhaust gas downstream said cylinder (12), said temperature sensor (38) being in communication with said control system (6) such that said control system (6) can determine said exhaust temperature information on the basis of information sensed from said exhaust gas temperature sensor (38), optionally said exhaust gas temperature sensor (38) is adapted to sense said temperature of exhaust gas at a position downstream said downstream said turbine (22;40).

Example 15: A method for operating an internal combustion engine system 4, said internal combustion engine system 4 comprising:
an internal combustion engine 10 comprising a cylinder 12;
an air guide 14 arranged to guide air to the cylinder 12;
at least one inlet valve 16 adapted to selectively provide a fluid communication between said air guide 14 and said cylinder 12;
an inlet valve actuation assembly 18 for actuating said at least one inlet valve 16, said inlet valve actuation assembly 18 being adapted to actuate said at least one inlet valve 16 in accordance with one of at least two lift modes during a combustion cycle of said internal combustion engine (10), wherein:
a first lift mode of said at least one inlet valve 16 is associated with: a first opening instance, at which said at least one inlet valve 16 becomes open from a closed position; a first maximum lift, and a first closing instance, at which said at least one inlet valve 16 becomes closed;
a second lift mode of said at least one inlet valve 16 is associated with: a second opening instance, at which said at least one inlet valve 16 becomes open from a closed position; a second maximum lift and a second closing instance, at which said at least one inlet valve 16 becomes closed, wherein
said first opening instance is equal to said second opening instance; said first maximum lift is equal to said second maximum lift and said second closing instance occurs later in said combustion cycle than said first closing instance;

a turbo 20 comprising a turbine 22;40 in fluid communication with said cylinder 12, said turbine 22; 40 comprising a turbine wheel 24;

a throttle arrangement 28 arranged between said cylinder 12 and said turbine wheel 24, as seen in a direction of flow from said cylinder 12 to said turbine wheel 24, said throttle arrangement 28 being adapted to assume a plurality of different conditions for throttling exhaust gas from said cylinder 12 to said turbine wheel 24, said plurality of different conditions comprising an open condition with a smallest throttling of said exhaust gas amongst said conditions as well as an at least partially closed condition associated with a throttling being larger than said smallest throttling, said method comprising operating said internal combustion engine system 4 in a first operation mode in which said throttle arrangement 28 is arranged in said at least partially closed condition and said inlet valve actuation assembly 18 actuates said at least one inlet valve 16 according to said second lift mode.

Example 16: The method of Example 15, wherein said first closing instance occurs at a first crank angle for said cylinder 12 and said second closing instance occurs at a second crank angle for said cylinder 12.

Example 17: The method of Example 16, wherein a crank angle difference between said second crank angle and said first crank angle is in the range of 30°-60°, preferably in the range of 40°-50°.

Example 18: The method of Example 16 or Example 17, wherein said internal combustion engine 10 is a four stroke engine, said engine 10 comprising a piston 30 adapted to move in said cylinder 12 during an intake stroke ending at a bottom dead center at a bottom dead center crank angle for said piston 30.

Example 19: The method of Example 16, wherein said bottom dead center crank angle occurs on or before said first crank angle, preferably a difference between said first crank angle and said bottom dead center crank angle being in the range of 0°-20°, more preferred in the range of 0°-10°.

Example 20: The method of Example 18 or Example 19, wherein said bottom dead center crank angle occurs before said second crank angle, a difference between said second crank angle and said bottom dead center crank angle being in the range of 30°-60°, preferably in the range of 40°-50°.

Example 21: The method of any one of Examples 18 to 20, wherein a valve lift of said at least one inlet valve 16 when said piston 30 is at said bottom dead center in said second lift mode is in the range of 1% to 10% of said second maximum lift.

Example 22: The method of any one of Examples 15-21, wherein said internal combustion engine system 4 comprises an exhaust guide assembly 32 arranged to guide exhaust gas from said cylinder 12, wherein said throttle arrangement 28 comprises a pre-turbine throttle 34 arranged at least partially in a portion of said exhaust guide assembly 32, said pre-turbine throttle 34 being adapted to assume said plurality of different conditions resulting in different opening percentages of said portion of said exhaust guide assembly 32, said open condition being associated with a largest opening percentage amongst said conditions and said at least partially closed condition being associated with an opening percentage being smaller than said largest opening percentage.

Example 23: The method of Example 22, wherein said pre-turbine throttle 34 comprises a pivotable flap 36, such as a continuously pivotable flap 36, pivotable between said open condition and an end condition, preferably said end condition resulting in that said portion of said exhaust guide assembly 32 is fully closed.

Example 24: The method of any one of Examples 15-23, wherein said turbo 155 comprises a plurality of guide vanes 42 that are adapted to move so as to control the throttling of said exhaust gas.

Example 25: The method of any one of Examples 15-24 further comprising receiving at least the following current operating information: an engine torque (ET) produced by said internal combustion engine (10); an engine speed (ES) of said internal combustion engine (10), and an exhaust temperature information ($T_{ex}$) indicative of a temperature of said exhaust gas from said cylinder (12), said method comprising issuing information to at least one of said inlet valve actuation assembly (18) and said throttle arrangement (28) in response to said current operating information, said information to said inlet valve actuation assembly (18) comprising information relating to a target lift mode (TLM) and said information to said throttle arrangement (28) relating to a target condition of said throttle arrangement (28).

Example 26: The method of Example 25, further comprising using a set of lift mode maps (60-1, 60-2, ..., 60-N), each lift mode map (60-1, 60-2, ..., 60-N) being associated with a certain value (T1, T2, ...,TN) of said exhaust temperature information ($T_{ex}$) and containing information about a predetermined lift mode for a plurality of combinations of values of said engine torque (ET) and said engine speed (ES), respectively, said method also comprising determining said target lift mode (TLM) using: said lift mode maps (60-1, 60-2, ..., 60-N); said engine torque (ET); said engine torque (ET) and said exhaust temperature information ($T_{ex}$), of said current operating information an optionally carrying out one or more interpolations within and/or between said set of lift mode maps (60-1, 60-2, ..., 60-N) for determining said target lift mode (TLM).

Example 27: The method of Example 25 or Example 26, further comprising using a set of exhaust characteristic maps (70-1, 70-2, ..., 70-N), each exhaust characteristic map being associated with a certain value (T1, T2, ..., TN) of said exhaust temperature information ($T_{ex}$) and containing information about a predetermined exhaust gas characteristic of exhaust gases produced by said internal combustion engine system (4), wherein said exhaust characteristic is an exhaust power or an exhaust gas mass flow, for a plurality of combinations of values of said engine torque (ET) and said engine speed (ES), said method comprising determining a target exhaust characteristic using said exhaust characteristic maps (70-1, 70-2, ..., 70-N); said engine torque (ET); said engine torque (ET) and said exhaust temperature ($T_{ex}$) information of said current operating information, optionally said method comprising carrying out one or more interpolations within and/or between said set of exhaust characteristic maps (70-1, 70-2, ..., 70-N) for determining said target exhaust characteristic.

Example 28: The method of Example 27, wherein said method comprises using said target exhaust characteristic and to control the condition of said throttle arrangement (28) using a closed loop (74) using the target exhaust characteristic as a set point value for said closed loop control.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

What is claimed is:

1. An internal combustion engine system comprising:
an internal combustion engine comprising a cylinder;
an air guide arranged to guide air to the cylinder;
at least one inlet valve adapted to selectively provide a fluid communication between said air guide and said cylinder;
an inlet valve actuation assembly for actuating said at least one inlet valve, said inlet valve actuation assembly being adapted to actuate said at least one inlet valve in accordance with each one of at least two lift modes during a combustion cycle of said internal combustion engine, wherein:
a first lift mode of said at least one inlet valve comprising: a first opening instance, at which said at least one inlet valve becomes open from a closed position; a first maximum lift, and a first closing instance, at which said at least one inlet valve becomes closed;
a second lift mode of said at least one inlet valve comprising: a second opening instance, at which said at least one inlet valve becomes open from a closed position; a second maximum lift, and a second closing instance, at which said at least one inlet valve becomes closed, wherein
said first opening instance is equal to said second opening instance;
said first maximum lift is equal to said second maximum lift, and said second closing instance occurs later in said combustion cycle than said first closing instance;
a turbo comprising a turbine in fluid communication with said cylinder, said turbine comprising a turbine wheel;
a throttle arrangement arranged between said cylinder and said turbine wheel, as seen in a direction of flow from said cylinder to said turbine wheel, said throttle arrangement being adapted to assume a plurality of different conditions for throttling exhaust gas from said cylinder to said turbine wheel, said plurality of different conditions comprising an open condition with a smallest throttling of said exhaust gas amongst said conditions as well as an at least partially closed condition with a throttling being larger than said smallest throttling,
said internal combustion engine system being adapted to be operated in a first operation mode in which said throttle arrangement is arranged in said at least partially closed condition and said inlet valve actuation assembly actuates said at least one inlet valve according to said second lift mode.

2. The internal combustion engine system of claim 1, wherein said first closing instance occurs at a first crank angle for said cylinder and said second closing instance occurs at a second crank angle for said cylinder, optionally a crank angle difference between said second crank angle and said first crank angle is in a range of 30°-60°.

3. The internal combustion engine system of claim 2, wherein said internal combustion engine is a four stroke engine, said engine comprising a piston adapted to move in said cylinder during an intake stroke ending at a bottom dead center at a bottom dead center crank angle for said piston.

4. The internal combustion engine system of claim 3, wherein said bottom dead center crank angle occurs on or before said first crank angle, wherein a difference between said first crank angle and said bottom dead center crank angle is in a range of 0°-20°.

5. The internal combustion engine system of claim 3, wherein said bottom dead center crank angle occurs before said second crank angle, wherein a difference between said second crank angle and said bottom dead center crank angle is in a range of 30°-60°.

6. The internal combustion engine system of claim 3, wherein a valve lift of said at least one inlet valve when said piston is at said bottom dead center in said second lift mode is in a range of 1% to 10% of said second maximum lift.

7. The internal combustion engine system of claim 1, wherein said internal combustion engine system comprises an exhaust guide assembly arranged to guide exhaust gas from said cylinder, wherein said throttle arrangement comprises a pre-turbine throttle arranged at least partially in a portion of said exhaust guide assembly, said pre-turbine throttle being adapted to assume said plurality of different conditions resulting in different opening percentages of said portion of said exhaust guide assembly, said open condition comprising a largest opening percentage amongst said conditions and said at least partially closed condition comprising an opening percentage being smaller than said largest opening percentage.

8. The internal combustion engine system of claim 7, wherein said pre-turbine throttle comprises a pivotable flap pivotable between said open condition and an end condition, wherein said end condition resulting in that said portion of said exhaust guide assembly is fully closed.

9. The internal combustion engine system of claim 1, wherein said turbo comprises a plurality of guide vanes that are adapted to move so as to control the throttling of said exhaust gas.

10. The internal combustion engine system of claim 1, wherein said internal combustion engine system further comprises a control system for controlling said inlet valve actuation assembly and/or said throttle arrangement, said control system being adapted to receive at least the following current operating information: an engine torque produced by said internal combustion engine; an engine speed of said internal combustion engine, and an exhaust temperature information indicative of a temperature of said exhaust gas from said cylinder, said control system being adapted to issue information to at least one of said inlet valve actuation assembly and said throttle arrangement in response to said current operating information, said information to said inlet valve actuation assembly comprising information relating to a target lift mode and said information to said throttle arrangement relating to a target condition of said throttle arrangement.

11. The internal combustion engine system of claim 10, wherein said control system is adapted to use a set of lift mode maps, each lift mode map of the set of lift mode maps comprising a certain value of said exhaust temperature information and containing information about a predetermined lift mode for a plurality of combinations of values of said engine torque and said engine speed, respectively, said control system being adapted to determine said target lift mode using: said lift mode maps; said engine torque; said engine torque and said exhaust temperature information of said current operating information, wherein said control system is adapted to carry out one or more interpolations within and/or between said set of lift mode maps for determining said target lift mode.

12. The internal combustion engine system of claim 10, wherein said control system is adapted to use a set of exhaust characteristic maps, each exhaust characteristic map of the set of exhaust characteristic maps comprising a certain value of said exhaust temperature information and containing information about a predetermined exhaust gas characteristic of exhaust gases produced by said internal combustion engine system, wherein said exhaust characteristic is an exhaust power or an exhaust gas mass flow, for a plurality of combinations of values of said engine torque and said engine speed, said control system being adapted to determine a target exhaust characteristic using said exhaust characteristic maps; said engine torque; said engine torque and said exhaust temperature information of said current operating information, wherein said control system is adapted to carry out one or more interpolations within and/or between said set of exhaust characteristic maps for determining said target exhaust characteristic.

13. The internal combustion engine system of 12, wherein said control system is adapted to use said target exhaust characteristic and to control the condition of said throttle arrangement using a closed loop using the target exhaust characteristic as a set point value for said closed loop control.

14. The internal combustion engine system of claim 10, wherein said internal combustion engine system comprises an exhaust gas temperature sensor for sensing said temperature of exhaust gas downstream said cylinder, said temperature sensor being in communication with said control system such that said control system can determine said exhaust temperature information on a basis of information sensed from said exhaust gas temperature sensor, optionally said exhaust gas temperature sensor is adapted to sense said temperature of exhaust gas at a position downstream of said turbine.

15. A method for operating an internal combustion engine system, said internal combustion engine system comprising:

an internal combustion engine comprising a cylinder;

an air guide arranged to guide air to the cylinder;

at least one inlet valve adapted to selectively provide a fluid communication between said air guide and said cylinder;

an inlet valve actuation assembly for actuating said at least one inlet valve, said inlet valve actuation assembly being adapted to actuate said at least one inlet valve in accordance with each one of at least two lift modes during a combustion cycle of said internal combustion engine, wherein:

a first lift mode of said at least one inlet valve comprising: a first opening instance, at which said at least one inlet valve becomes open from a closed position; a first maximum lift, and a first closing instance, at which said at least one inlet valve becomes closed;

a second lift mode of said at least one inlet valve is associated with comprising: a second opening instance, at which said at least one inlet valve becomes open from a closed position; a second maximum lift, and a second closing instance, at which said at least one inlet valve becomes closed, wherein said first opening instance is equal to said second opening instance; said first maximum lift is equal to said second maximum lift, and said second closing instance occurs later in said combustion cycle than said first closing instance;

a turbo comprising a turbine in fluid communication with said cylinder, said turbine comprising a turbine wheel;

a throttle arrangement arranged between said cylinder and said turbine wheel, as seen in a direction of flow from said cylinder to said turbine wheel, said throttle arrangement being adapted to assume a plurality of different conditions for throttling exhaust gas from said cylinder to said turbine wheel, said plurality of different conditions comprising an open condition with a smallest throttling of said exhaust gas amongst said conditions as well as an at least partially closed condition with a throttling being larger than said smallest throttling, said method comprising operating said internal combustion engine system in a first operation mode in which said throttle arrangement is arranged in said at least partially closed condition and said inlet valve actuation assembly actuates said at least one inlet valve according to said second lift mode.

* * * * *